United States Patent
Simofi-Ilyes et al.

(10) Patent No.: US 7,454,127 B2
(45) Date of Patent: Nov. 18, 2008

(54) MULTI-SPEED MOTOR SYSTEM COMBINING AT LEAST A ONE SPEED ELECTRIC MOTOR, SERIES RESISTOR AND POWER SWITCHES

(75) Inventors: Attila Simofi-Ilyes, London (CA); Andrew Lakerdas, London (CA); Mike Toner, Appin (CA)

(73) Assignee: Continental Automotive Systems US, Inc., Auburn Hills ( * ) Notice: Subject to any disclaimer, the term of this patent is extended or adjusted under 35 U.S.C. 154(b) by 218 days.

(21) Appl. No.: 11/105,887

(22) Filed: Apr. 14, 2005

(65) Prior Publication Data

US 2006/0083490 A1    Apr. 20, 2006

Related U.S. Application Data

(60) Provisional application No. 60/619,995, filed on Oct. 19, 2004.

(51) Int. Cl.
*H02P 7/06* (2006.01)
(52) U.S. Cl. .................................. 388/806
(58) Field of Classification Search ........... 318/138, 318/244, 246, 254, 439, 700, 801–823; 388/801–823
See application file for complete search history.

(56) References Cited

U.S. PATENT DOCUMENTS

| | | | | |
|---|---|---|---|---|
| 3,612,969 A | * | 10/1971 | Cockroft | 318/123 |
| 3,833,845 A | * | 9/1974 | Smallbone et al. | 388/839 |
| 3,962,615 A | * | 6/1976 | Spangler | 388/838 |
| 4,008,424 A | | 2/1977 | Bompani | |
| 4,066,937 A | | 1/1978 | Pfarrer et al. | |
| 4,137,014 A | | 1/1979 | Parker | |
| 4,378,855 A | | 4/1983 | Haub et al. | |
| 4,520,299 A | | 5/1985 | Konrad | |
| 4,910,790 A | * | 3/1990 | Kershaw | 388/836 |
| 5,347,205 A | * | 9/1994 | Piland | 318/811 |
| 5,571,999 A | | 11/1996 | Harris | |
| 5,689,148 A | | 11/1997 | Rubinchik | |
| 5,734,219 A | | 3/1998 | Horski et al. | |
| 5,883,488 A | | 3/1999 | Woodward | |
| 5,925,999 A | | 7/1999 | Lakerdas et al. | |
| 5,949,173 A | | 9/1999 | Wille et al. | |
| 6,694,599 B1 | * | 2/2004 | Kershaw et al. | 29/597 |
| 6,717,301 B2 | | 4/2004 | DeDarran et al. | |
| 2001/0000270 A1 | | 4/2001 | Moss et al. | |

(Continued)

FOREIGN PATENT DOCUMENTS

JP    54149161    11/1979

(Continued)

*Primary Examiner*—Lincoln Donovan
*Assistant Examiner*—Erick Glass

(57) ABSTRACT

A multi-speed permanent magnet D.C. electric motor system 10 includes at least one permanent magnet DC electric motor 11 configured to operate at at least one speed. A current limiting device R1 is constructed and arranged to lower electrical input power to the motor 11 so that a speed of the motor is reduced, when the motor is powered together with the current limiting device, as compared to a speed of the motor powered absent the current limiting device. Switching structure K1, K2, K3 is associated with the current limiting device to selectively operate the motor at at least three discrete speeds, even though the motor is configured for at least one-speed operation.

23 Claims, 4 Drawing Sheets

U.S. PATENT DOCUMENTS

| | | |
|---|---|---|
| 2001/0000642 A1 | 5/2001 | Moss et al. |
| 2001/0011879 A1 | 8/2001 | Erdman |
| 2004/0016061 A1 | 1/2004 | Broker et al. |
| 2004/0134175 A1 | 7/2004 | Osborne |

FOREIGN PATENT DOCUMENTS

| | | |
|---|---|---|
| WO | WO 9610863 | 4/1996 |

* cited by examiner

MULTI-SPEED MOTOR SYSTEM COMBINING AT LEAST A ONE SPEED ELECTRIC MOTOR, SERIES RESISTOR AND POWER SWITCHES

This application is based on Provisional Application No. 60/619,995 filed on Oct. 19, 2004 and claims the benefit thereof for priority purposes.

FIELD OF THE INVENTION

This invention relates to motors for automotive applications such as, but is not limited to, engine cooling, HVAC (Heating, Ventilation, and Air Conditioning), or ABS (Antilock Braking System).

BACKGROUND OF THE INVENTION

There is an increasing demand of multi-speed operation of electric motors used in automotive applications, especially in engine cooling applications where lower fan speed operation is required to reduce power consumption and the noise pollution during lower or normal engine load conditions. The high fan speed from the engine cooling unit is required for maximum, worst case engine load conditions. There are a variety of different configurations and methods available on the market for two or multi speed operation of electric motors.

For Permanent Magnet Direct Current Brush Motors (PMDC BM) historically lower speeds (multiple speed operation) have been achieved by the following methods:
- Adding a resistor in series with the motor
- Switching out brushes
- Dual armature winding with dual commutator
- Adding an additional $3^{rd}$ brush (short out coils)
- External or internal electronic control comprised of but not limited to:
  - SSR, (Solid State Relays), Linear control, PWM, (Pulse Width Modulation), Variable flux coils combined with permanent magnets As is evident from the above list, there are many solutions available for varying the speed of an electric motor. However, most of these solutions, which are more economically feasible, are limited to two or maximum three speed operations. The higher technology products such as the PWM controllers are truly capable of operating at variable/multi-speeds. However, the complexity and cost of such controllers are significantly higher than the lower cost two or three speed conventional solutions.

Although the PWM controllers can provide variable/multi speed control for such as the engine cooling unit, most of the auto manufacturers are only using (programming into the ECU) four load points. Some auto manufacturers and engine cooling pack suppliers expressed interest for lower cost four-speed engine cooling modules.

Therefore, there is a need to provide a new, low cost solution to achieve four-speed operation of an electric motor used in automotive applications such as an engine cooling module.

SUMMARY OF THE INVENTION

An object of the invention is to fulfill the need referred to above. In accordance with the principles of the present invention, this objective is achieved by providing a multi-speed permanent magnet D.C. electric motor system including a permanent magnet DC electric motor configured to operate at at least one speed. Current limiting structure is constructed and arranged to lower electrical input power to the motor so that a speed of the motor is reduced, when the motor is powered together with the current limiting structure, as compared to a speed of the motor powered absent the current limiting structure. Switching structure is associated with the current limiting structure to selectively operate the motor at at least three discrete speeds, even though the motor is configured for at least one-speed operation.

In accordance with another aspect of the invention, a method is provided to operate a permanent magnet D.C. electric motor, configured to operate at two different speeds, at at least three discrete speeds. The method provides a permanent magnet D.C. electric motor including a first winding for operating the motor at one of the two different speeds and a second winding for operating the motor at the other of the two speeds that is lower than the one speed. A current limiting device is constructed and arranged to lower electrical input power to the motor so that a speed of the motor is reduced, when the motor is powered together with the current limiting device, as compared to a speed of the motor powered absent the current limiting device. A first switch, a second switch, and a third switch are provided in series. The second switch is in parallel with the current limiting device such that when the second switch is open, current flows through the current limiting device. The third switch is selectively associated with a first contact that is constructed and arranged to ensure that current is supplied to both the first and second windings, and a second contact constructed and arranged to ensure that current is supplied only to the first winding. The switches are controlled to operate, together with the current limiting device, the motor at at least three discrete speeds.

Other objects, features and characteristics of the present invention, as well as the methods of operation and the functions of the related elements of the structure, the combination of parts and economics of manufacture will become more apparent upon consideration of the following detailed description and appended claims with reference to the accompanying drawings, all of which form a part of this specification.

BRIEF DESCRIPTION OF THE DRAWINGS

The invention will be better understood from the following detailed description of the preferred embodiments thereof, taken in conjunction with the accompanying drawings, wherein like reference numerals refer to like parts, in which.

DETAILED DESCRIPTION OF THE EXEMPLARY EMBODIMENT

The embodiment combines two of the available technologies for speed control mentioned above and develops a new method and system for four-speed operation. More specifically, by systematically switching and energizing a two-speed motor (dual armature winding with dual commutator system) combined with a current limiting device through a switch structure described below, four distinctive operating speeds can be accomplished.

Figure 1:
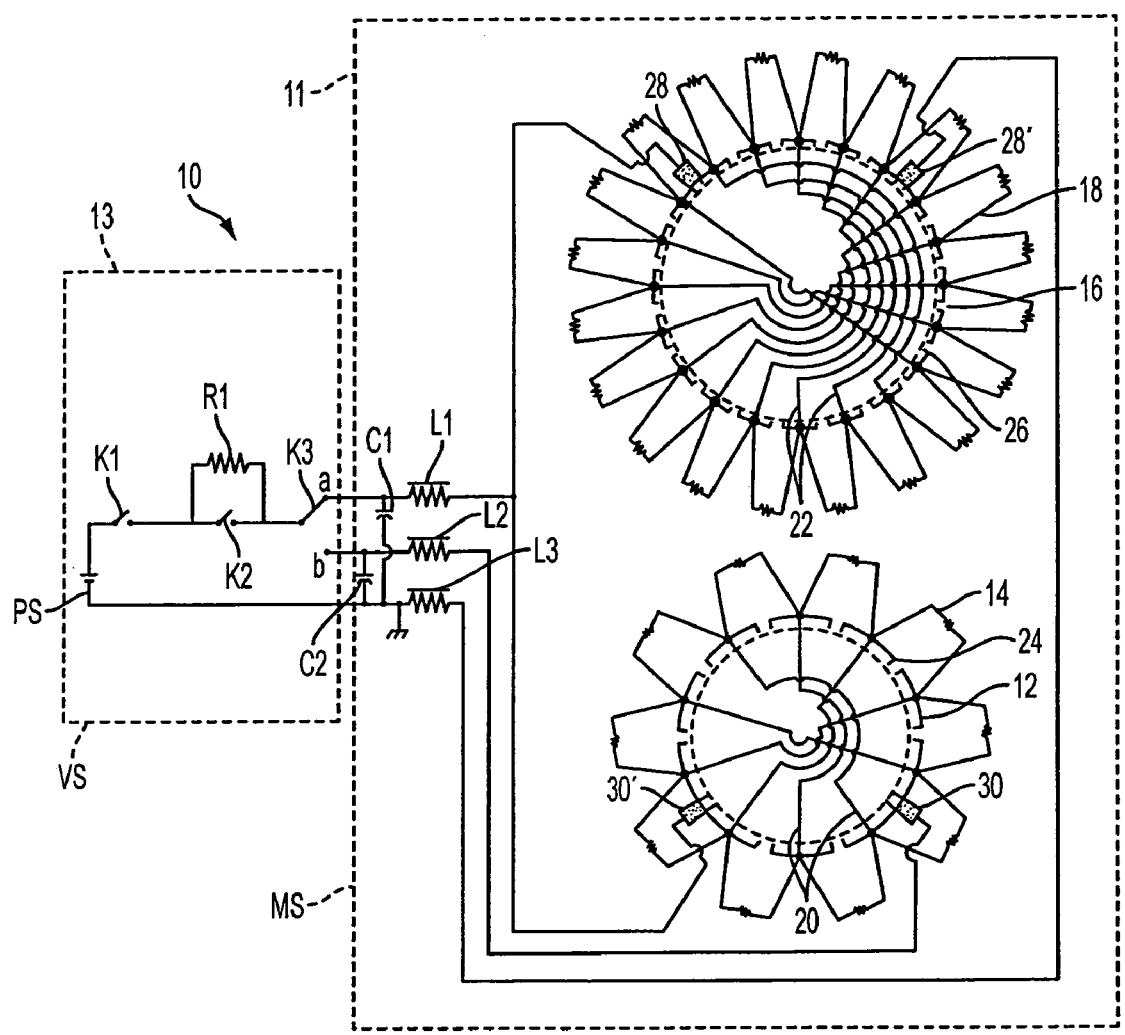
FIG. 1 is a schematic view of a system including a motor and vehicle side circuitry having a series resistor and switch structure for controlling four-speed operation of a motor, provided in accordance with the principles of the invention.

A system, provided in accordance with the principles of the invention is shown, generally indicated at 10, in FIG. 1. The system 10 includes a motor 11 and vehicle side circuitry 13. The motor 11 is described in the provisional patent applications 60/560,457, filed on Apr. 8, 2004, and 60/579,949, filed on Jun. 15, 2004, the contents of which are hereby incorporated by reference into the present specification.

As shown in FIG. 1, a two speed motor 11 has a link wound, low speed (LS) commutator 12 electrically connected with a LS winding 14, and a link wound, high speed (HS) commutator 16 electrically connected with a HS winding 18. A link winding of the LS commutator 12 is indicated at 20 and a link winding of the HS commutator 16 is indicated at 22. The linking of commutator 12 is done preferably with a wire by electrically interconnecting each commutator bar 24, via respective hooks (not shown), with another commutator bar at 180° apart. Similarly, the linking of commutator 16 is done preferably with a wire by electrically interconnecting each commutator bar 26, via respective hooks (not shown), with another commutator bar at 180° apart. This link winding technology is disclosed, for example in U.S. Pat. No. 6,694,599, the contents of which is hereby incorporated into the present specification by reference. The following U.S. Patents describe the art of dual-armature winding and dual commutators well: U.S. Pat. No. 5,925,999 and U.S. Pat. No. 4,910,790, the contents of these three patents are hereby incorporated by reference into the preset specification. The LS commutator 12 is typically mounted on a shaft (not shown) and the HS commutator 16 is typically mounted over the LS commutator 12.

Since each commutator 12 and 16 is link-wound, in a four pole motor, advantageously, only two brushes are required on each side of a brush card assembly, one at the positive potential and one at the negative potential. By cross-linking sets of commutator bars, the second two positive and negative brushes of the conventional four pole motor are not required since the electrical paths are created by the link winding. As shown in FIG. 1, there is a pair of brushes (positive brush 28 and negative brush 28'), associated with the HS commutator 16. Also, there is a pair of brushes (positive brush 30 and negative brush 30") associated with the LS commutator 12.

Figures 2, 3:
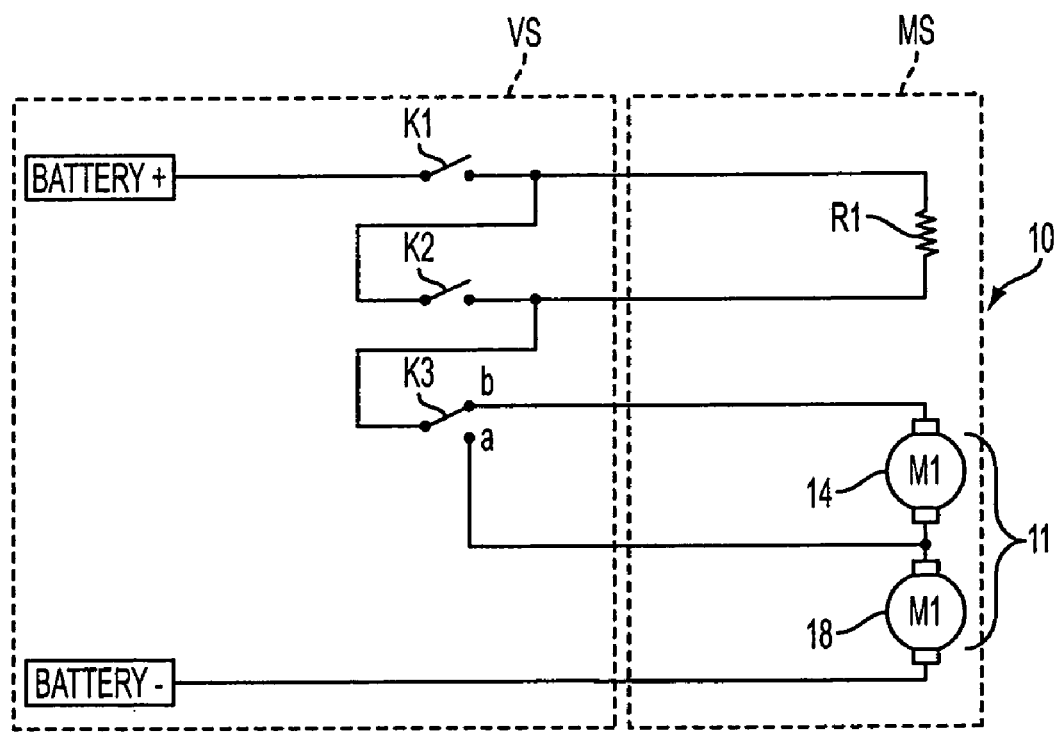
FIG. 2 is a chart showing switch activation for controlling the motor of FIG. 1 at four discrete speeds.
FIG. 3 is a simplified schematic of FIG. 1, but with the series resistor shown on the motor side.

The series resistor R1 shown in both FIG. 1 and FIG. 3 is a current limiting device that can lower the electrical input power to the motor system 10. Therefore, the speed of the motor system 10 is lower when it is energized together with the series resistor R1. There are many different type of current limiting devices are available on the market, and the resistor is merely one example thereof.

FIG. 1 shows the electrical circuit 13 including the relay circuit at the vehicle side (VS) and the Frequency Interference (RFI) suppression circuit at the motor side (MS). As shown in FIG. 1, chokes are provided for RFI suppression. Choke L1 is provided for the positive brush 28. Choke L2 is provided for the positive brush 30 for LS and choke L3 is provided for the negative brush 28' for both LS and HS.

The electrical schematic of FIG. 1 is also illustrated in a more simplistic manner in FIG. 3. Switches K1, K2 and K3 are preferably Electromagnetic Relays or MOSFETs. However, any suitable switching device can be employed. In FIG. 3, the current limiting device R1 is provided on the motor side MS, instead of on the vehicle side VS as in FIG. 1.

The electrical circuit is configured such that the system 10 is directly connected to the power source (PS) or Battery and depending on the logic circuit (not shown) the switches K1, K2, and K3 can be energized in the sequence as shown in FIG. 2. FIG. 2 tabulates the switching sequence of the K1, K2, K3 switches to accomplish at least three discrete operating speeds (preferably four discrete speeds) of the two-speed motor 11.

The system 10 will operate at speed 1 (as tabulated in FIG. 2) when the switch K1 is closed (energized), K2 is open (not energized, therefore the electrical current flows through the current limiting device R1, such as a series resistor) and the K3 switch is at contact position "b". Therefore, the electrical current continues to flow from the current limiting device through both the LS and HS armature windings 14 and 18, respectively.

The system 10 will operate at speed 2 (as tabulated in FIG. 2) when the switch K1 is closed (energized), K2 is open (not energized, therefore the electrical current flows through the current limiting device R1) and the K3 switch is at contact position "a". Therefore, the electrical current continues to flow from the current limiting device through the HS armature winding 18.

The system 10 will operate at speed 3 (as tabulated in FIG. 2) when the switch K1 is closed (energized), K2 is closed (energized, therefore the electrical current will flow through the K2 switch and bypass the current limiting device R1) and the K3 switch is at position "b". Therefore, the electrical current only flows through the LS and HS armature windings 14 and 18, respectively.

The system 10 will operate at speed 4 (as tabulated in FIG. 2) when the switch K1 is closed (energized), K2 is closed (energized, therefore the electrical current will flow through the K2 switch and bypass the current limiting device R1) and the K3 switch is at position "a". Therefore, the electrical current flows through only the HS armature winding 18.

The system 10 will be at zero speed or OFF when the K1 switch is open (not energized); the position of K2 or K3 switches does not matter in this state.

Figure 4:
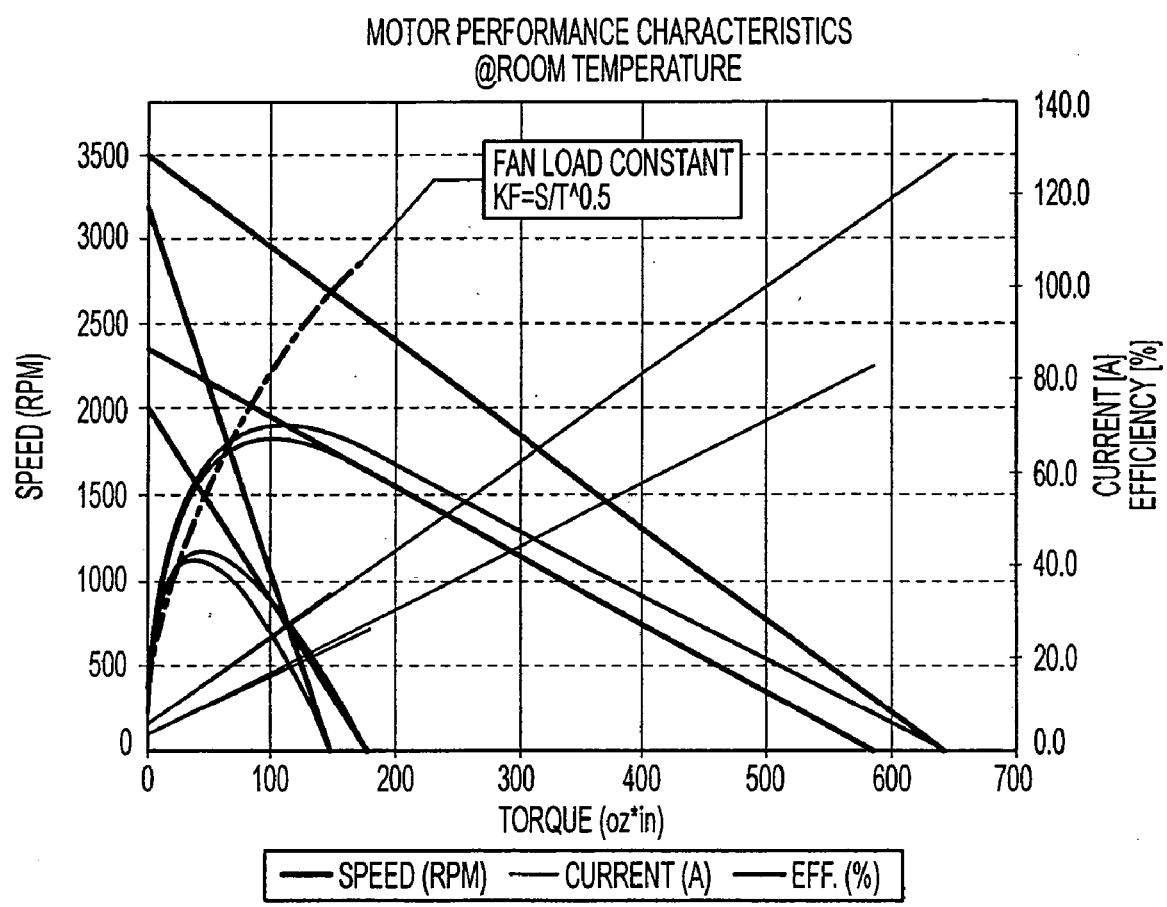
FIG. 4 is a graph showing the relationship between motor performance characteristics and speed of a motor at four discrete motor speeds.

FIG. 4 illustrates typical performance curves at four different speeds of a given PMDC brush type motor. The speed separation between each operating point can be altered by the following three methods or the combination of the three methods: one method is changing the resistance value of the current limiting device; the second is changing the wire gauge used in the armature winding (HS and, or LS), and the third is changing the number of wire turns in the armature winding (HS and, or LS).

Figure 5:
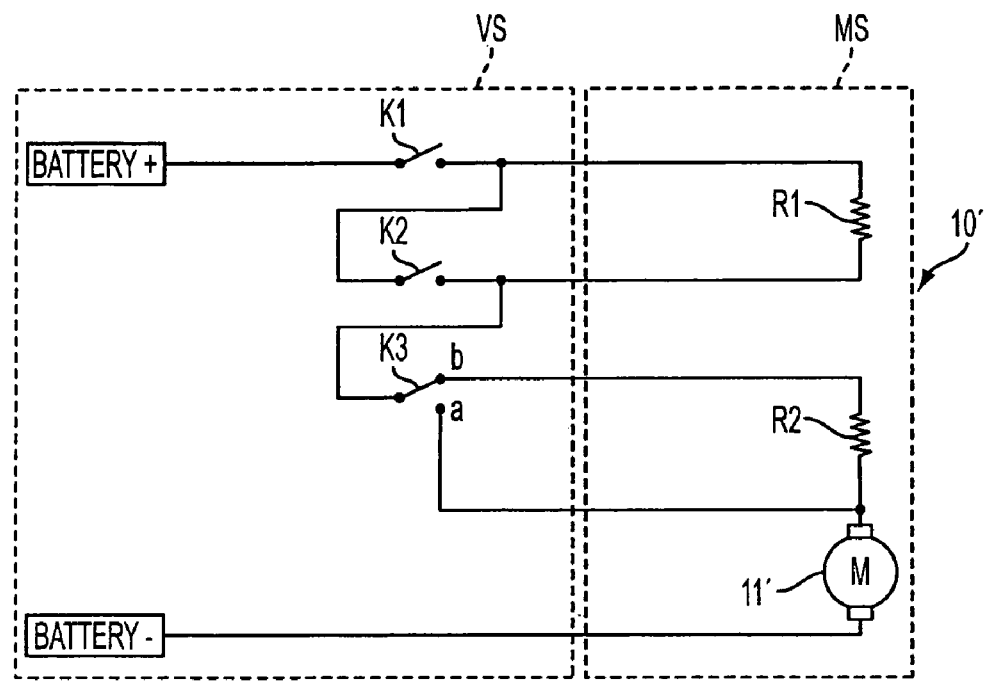
FIG. 5 is a schematic view similar to FIG. 3, but with the low speed winding of FIG. 3 replaced with a resistor.

FIG. 5 is a schematic view of a system 10' similar to system 10 of FIG. 3, but with the low speed winding 14 of FIG. 3 replaced with a current limiting device such as a resistor R2. The switches K1, K2, K3 are controlled as shown in FIG. 2. Thus, the motor 11' is a single speed motor, however, the motor 11' can be operated at at least three discrete speeds (preferably four discrete speeds).

Figure 6:
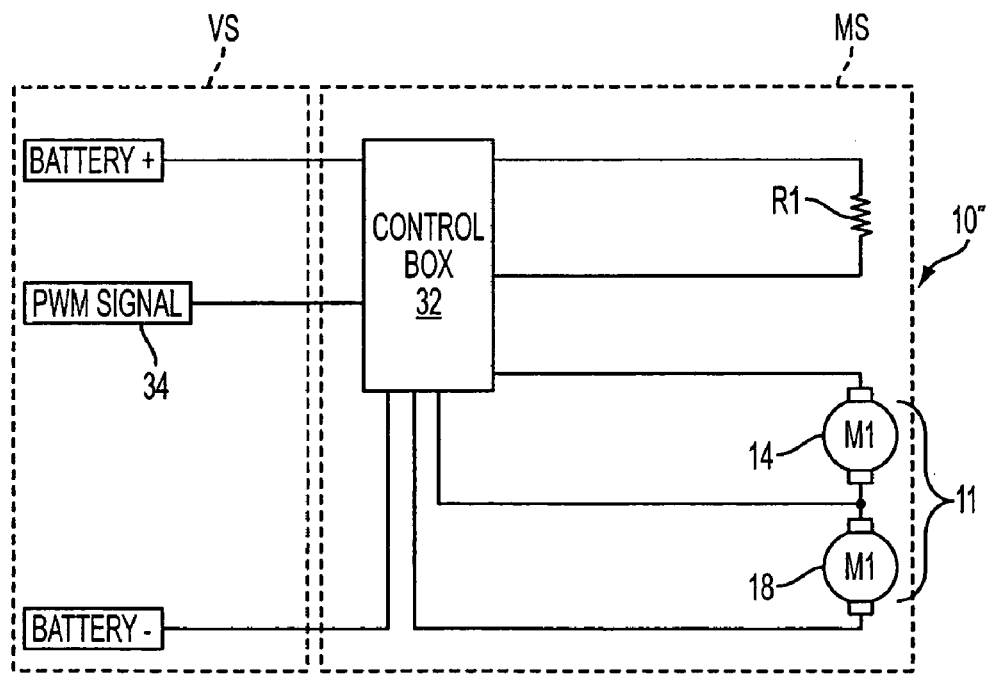
FIG. 6 is a schematic view similar to FIG. 3, but with the switches provided in a control box to which a PWM signal is fed.

FIG. 6 is a schematic view of a system 10" similar to the system 10 of FIG. 3, but the switches K1, K2, and K3 (not shown in FIG. 6) are provided in a control box 32 on the motor side MS. A Pulse Width Modulated (PWM) signal 34 is fed to the control box 32. The operating speed required is communicated from an Engine Control Unit (ECU) of the vehicle system through the PWM signal 34 to the control box 32 and the appropriate switches K1, K2 or K3 are turned on to energize the motor in combination with the current limiting device R1.

The embodiments of FIGS. 1 and 6 advantageously require only three wires to be connected to the motor 11. The embodiments of FIGS. 3 and 5 require five wires to be connected to the motor 11 or 11'.

Thus, the system 10 provides a multi-speed system by using/combining at least one two speed electric motor and at least one current limiting device, or the system 10' provides a multi-speed system by using at least one, one-speed motor and at least two current limiting devices. The current limiting devices can be a series resistor. The two-speed electric motor preferably has a link wound dual commutator and a dual armature winding. A switching strategy uses switches to provide preferably four discrete speeds for a two-speed electric motor 11 or for a one-speed motor 11'. The switches are part of the vehicle electric circuit or integrated into the MS circuitry. Finally, the current limiting device(s) is part of the MS circuitry or external or integrally part of the electric motor as shown in FIG. 3; however it can be part of the VS circuit as shown in FIG. 1.

Although at least three discrete speeds and preferably four discrete speeds of motor operation are disclosed, it can be appreciated that by providing more switches and more current liming devices, more than four speeds of motor operation can be achieved.

The foregoing preferred embodiments have been shown and described for the purposes of illustrating the structural and functional principles of the present invention, as well as illustrating the methods of employing the preferred embodiments and are subject to change without departing from such principles. Therefore, this invention includes all modifications encompassed within the spirit of the following claims

What is claimed is:

1. A multi-speed permanent magnet D.C. electric motor system comprising:
at least one permanent magnet DC electric motor configured to operate at at least one speed,
current limiting structure constructed and arranged to lower electrical input power to the motor so that a speed of the motor is reduced, when the motor is powered together with the current limiting structure, as compared to a speed of the motor powered absent the current limiting structure, and
switching structure associated with the current limiting structure to selectively operate the motor at at least three discrete speeds, even though the motor is configured for at least one speed operation,
wherein the current limiting structure is only a single resistor in series with the motor.

2. The system of claim 1, wherein the motor is a two-speed motor having dual armature windings and dual commutators, each commutator being link wound.

3. The system of claim 2, wherein the switching structure includes a first switch, a second switch, and a third switch, all consecutively arranged in series, the second switch being in parallel with the resistor such that when the second switch is open, current flows through the resistor.

4. The system of claim 3, wherein the motor includes a first winding for operating the motor at one of the two different speeds and a second winding for operating the motor at the other of the two speeds that is lower than the one speed, and wherein the third switch is selectively associated with a first contact that is constructed and arranged to ensure that current is supplied to both the first and second windings, and a second contact constructed and arranged to ensure that current is supplied only to the first winding.

5. The system of claim 4, wherein the switches are constructed and arranged such that the motor operates at a first speed when the first switch is closed, the second switch is open, and the third switch is closed at the first contact.

6. The system of claim 5, wherein the switches are constructed and arranged such that the motor operates at a second speed when the first switch is closed, the second switch is open, and the third switch is closed at the second contact.

7. The system of claim 6, wherein the switches are constructed and arranged such that the motor operates at a third speed when the first switch is closed, the second switch is closed, and the third switch is closed at the first contact.

8. The system of claim 7, wherein the switches are constructed and arranged such that the motor operates at a fourth speed when the first switch is closed, the second switch is closed, and the third switch is closed at the second contact.

9. The system of claim 3, wherein each of the switches is an electromagnetic relay.

10. The system of claim 3, wherein each of the switches is a MOSFET.

11. The system of claim 1, wherein the switching structure includes a first switch, a second switch, and a third switch, all consecutively arranged in series, the switches being provided in a control box associated with the motor, and the control box being constructed and arranged to receive a PWM signal to control the switches.

12. A multi-speed permanent magnet D.C. electric motor system comprising:
at least one permanent magnet DC electric motor configured to operate at at least one speed,
current limiting structure constructed and arranged to lower electrical input power to the motor so that a speed of the motor is reduced, when the motor is powered together with the current limiting structure, as compared to a speed of the motor powered absent the current limiting structure, and
switching structure associated with the current limiting structure to selectively operate the motor at at least three discrete speeds, even though the motor is configured for at least one speed operation,
wherein the motor is a one-speed motor having a single winding and the current limiting structure includes only a first resistor and a second resistor.

13. The system of claim 12, wherein the switching structure includes a first switch, a second switch, and a third switch, all consecutively arranged in series, the second switch being in parallel with the first resistor such that when the second switch is open, current flows through the first resistor.

14. The system of claim 13, wherein the third switch is selectively associated with a first contact that is constructed and arranged to ensure that current is supplied to the second resistor, and a second contact constructed and arranged to ensure that current bypasses the second resistor and is supplied to the motor.

15. A multi-speed permanent magnet D.C. electric motor system comprising:
permanent magnet DC electric motor including a first winding for operating the motor at one of the two different speeds and a second winding for operating the motor at the other of the two speeds that is lower than the one speed,
a single resistor defining a current limiting device constructed and arranged to lower electrical input power to the motor so that a speed of the motor is reduced, when the motor is powered together with the current limiting device, as compared to a speed of the motor powered absent the current limiting device, and
switching structure including a first switch, a second switch, and a third switch arranged in series, the second switch being in parallel with the current limiting device such that when the second switch is open, current flows through the current limiting device, the third switch being selectively associated with a first contact that is constructed and arranged to ensure that current is supplied to both the first and second windings, and a second contact constructed and arranged to ensure that current is supplied only to the first winding, the switches being associated with the current limiting device to selectively operate the motor at at least three discrete speeds, even though the motor is configured for two-speed operation.

16. The system of claim 15, wherein the switches are constructed and arranged such that the motor operates at:
   a first speed when the first switch is closed, the second switch is open, and the third switch is closed at the first contact,
   a second speed when the first switch is closed, the second switch is open, and the third switch is closed at the second contact,
   a third speed when the first switch is closed, the second switch is closed, and the third switch is closed at the first contact, and
   a fourth speed when the first switch is closed, the second switch is closed, and the third switch is closed at the second contact.

17. The system of claim 15, wherein the motor includes dual armature windings and dual commutators, each commutator being link wound.

18. A multi-speed permanent magnet D.C. electric motor system comprising:
   at least one permanent magnet DC electric motor configured to operate at at least one speed,
   means for lowering input power to the motor so that a speed of the motor is reduced, when the motor is powered together with the means for lowering, as compared to a speed of the motor powered absent the means for lowering, and
   means, associated with the means for lowering, for selectively operating the motor at at least three discrete speeds, even though the motor is configured for at least one-speed operation,
   wherein the means for lowering is only a single resistor in series with the motor.

19. The system of claim 18, wherein the motor is a two-speed motor having dual armature windings and dual commutators, each commutator being link wound.

20. The system of claim 19, wherein the means for selectively operating includes a first switch, a second switch, and a third switch arranged in series, the second switch being in parallel with the resistor such that when the second switch is open, current flows through the resistor.

21. The system of claim 20, wherein the motor includes a first winding for operating the motor at one of the two different speeds and a second winding for operating the motor at the other of the two speeds that is lower than the one speed, and wherein the third switch is selectively associated with a first contact that is constructed and arranged to ensure that current is supplied to both the first and second windings, and a second contact constructed and arranged to ensure that current is supplied only to the to the first winding.

22. The system of claim 15, wherein the switching structure includes a first switch, a second switch, and a third switch, all consecutively arranged in series, the second switch being in parallel with the first resistor such that when the second switch is open, current flows through the first resistor.

23. The system of claim 22, wherein the third switch is selectively associated with a first contact that is constructed and arranged to ensure that current is supplied to the second resistor, and a second contact constructed and arranged to ensure that current bypasses the second resistor and is supplied to the motor.

* * * * *